(12) United States Patent
Fayyaz

(10) Patent No.: US 6,850,742 B2
(45) Date of Patent: Feb. 1, 2005

(54) DIRECT CONVERSION RECEIVER

(75) Inventor: Nader Fayyaz, Ottawa (CA)

(73) Assignee: SiGe Semiconductor Inc., Ottawa (CA)

( * ) Notice: Subject to any disclaimer, the term of this patent is extended or adjusted under 35 U.S.C. 154(b) by 784 days.

(21) Appl. No.: 09/870,792

(22) Filed: Jun. 1, 2001

(65) Prior Publication Data

US 2002/0183034 A1 Dec. 5, 2002

(51) Int. Cl.[7] .............................. H01Q 11/12; H04B 1/04
(52) U.S. Cl. ....................................................... 455/118
(58) Field of Search ............................ 455/118, 115.1; 327/103; 375/350

(56) References Cited

U.S. PATENT DOCUMENTS 6,091,940 A 7/2000 Sorrells et al.

Primary Examiner—William Cumming
(74) Attorney, Agent, or Firm—Freedman & Associates

(57) ABSTRACT

In a frequency modulation radio receiver with direct conversion, a local oscillator signal is generated having a frequency within a preselected frequency range and the frequency is varied in response to a variable low frequency signal; the local oscillator signal is mixed with a received signal to provide a baseband signal. The variable low frequency signal is generated by a controlled oscillator in inverse relationship to a direct current component in said baseband signal. In a frequency modulation radio transceiver a broadcast function is provided by varying the low frequency signal with an information signal with the resulting local oscillator frequency being varied accordingly and amplified for broadcast. The transceiver is controlled to operate alternately in either a receive mode and a broadcast mode at substantially the same frequency. While in the receive mode the controlled oscillator causes the local oscillator signal to be drawn toward the carrier frequency of a received signal yielding preferred direct conversion of modulating information into the base band.

12 Claims, 1 Drawing Sheet

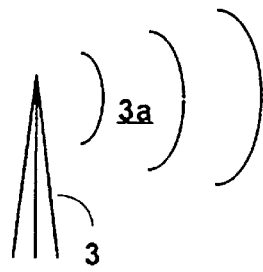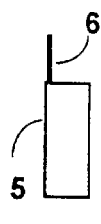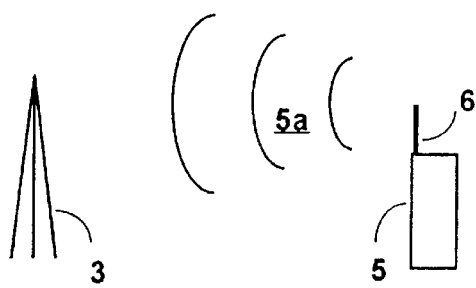
Fig. 1a    Fig. 1b
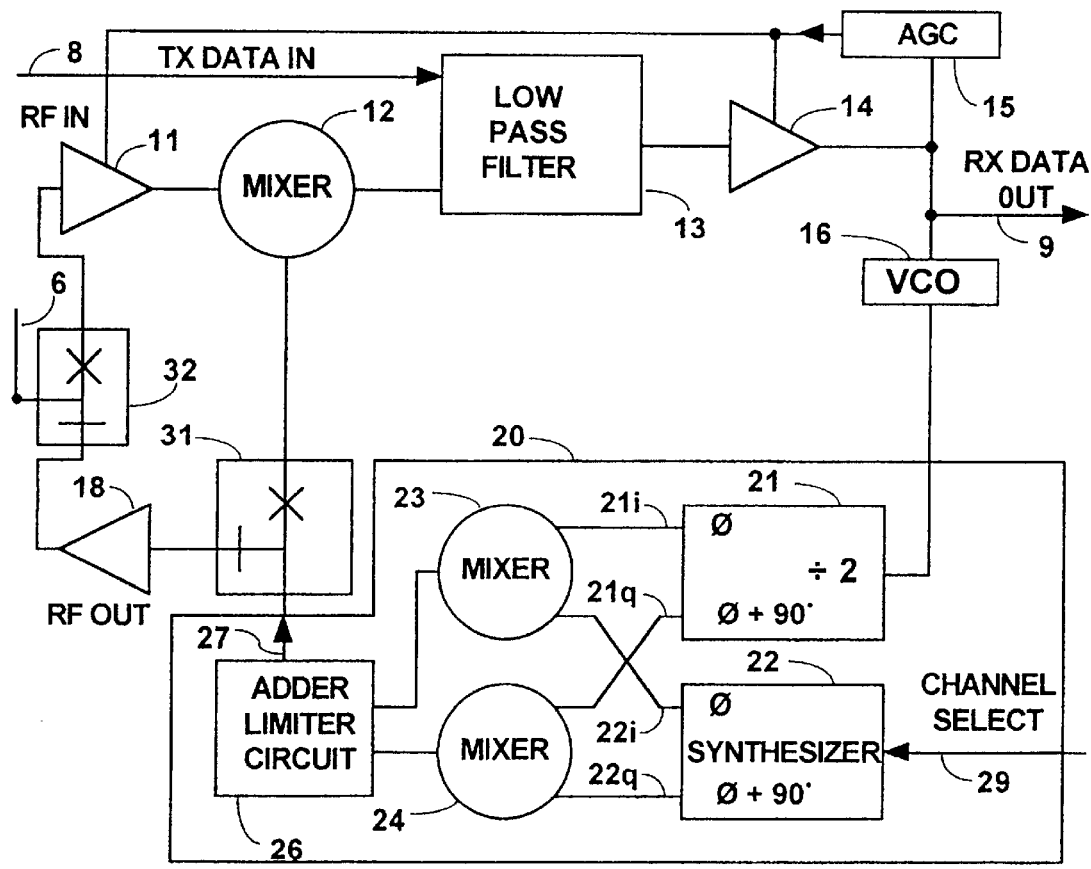
Fig. 2

DIRECT CONVERSION RECEIVER

The invention is in the field of radio transmitters and radio receivers and more particularly relates to radio transceivers wherein some of the components are used in common for both the reception and the transmission of frequency modulated radio signals.

BACKGROUND OF THE INVENTION

The demand for wireless communications can be said to be inversely related to the cost of providing portable radio transceivers. Hence it is preferred that such transceivers be provided substantially in an integrated circuit form to minimize cost.

A radio transceiver has two functions, one being that of broadcasting an information signal and the other being that of receiving an information signal. The two functions may occur coincidentally at different frequencies, as in full duplex operation, or the two functions may be mutually exclusive such that the function of receiving is interrupted when the broadcasting function occurs, as in simplex operation. In simplex operation, the broadcast signal can be at the same frequency as the signals being received. The transceiver is switched between the broadcast and receive functions to effect information exchange with another party either directly or via some intervening communications network. In one example the transceiver periodically switches between the broadcast and receive functions to effect exchanges of packetized data at a rates which appear to provide full duplex operation for a user.

Sophisticated transceivers based on superheterodyne principles have evolved over the years such that the weakest of recognizable signals can be usefully received and signals can be broadcast with very precise frequency and bandwidth control. One example is found in U.S. Pat. No. 5,423,076 issued Jun. 6, 1995 to Larry L. Westergren et al, titled "Superheterodyne Transceiver with Bilateral First Mixer and Dual Phase Locked Loop Frequency Control". The receive function is performed by circuitry which includes triple down conversion, requiring local oscillators, mixers and attendant bandpass filters for a receive frequency band as well as each of three successively lower intermediate frequencies.

In U.S. Pat. No. 6,006,081 titled "Communications Receivers" and issued Dec. 21, 1999, Paul A. Moore discloses an integrated zero IF receiver which receives an input signal and down converts it to substantially zero intermediate frequency quadrature related signals (I,Q). In one example the received signal is supplied to a pair of mixers. A local oscillator signal is supplied to one of the mixers directly and a phase shifted version of the local oscillator signal is supplied to the other of the mixers. The products of mixing from the one mixer are applied to a first lowpass filter which passes an in-phase difference signal (I) a demodulator. The products of mixing from the other mixer 16 are applied to a second low-pass filter 24 which passes a quadrature related difference signal (Q) to the demodulator. The demodulator recovers the original modulation. Tuning to any desired frequency is accomplished by varying the local oscillator signal.

The examples disclosed by Moore and Westergren et al are generally representative of the field of radio apparatus in that each requires a plurality of filters which can be difficult if not impossible to provide in integrated circuit form. Provision of such in discrete form with the required interconnections adds significantly to the expense of manufacture of small portable radio devices such as receivers and transceivers.

SUMMARY OF THE INVENTION

It is an object of the invention to provide a frequency modulation radio with direct conversion wherein a local oscillator signal is generated having a frequency within a preselected frequency range and the frequency being varied in response to a variable low frequency signal; the local oscillator signal is mixed with a received signal to provide a baseband signal and the variable low frequency signal is generated by a controlled oscillator in inverse relationship to a direct current component in said baseband signal.

It is also an object of the invention to provide a direct conversion transceiver which is economically producible with an integrated circuit manufacturing technology.

In accordance with an aspect of the invention, in a direct conversion transceiver, a local oscillator signal is generated from a variable low frequency signal produced by a controlled oscillator. In a receive mode, a local oscillator signal is mixed with a received signal to produce difference signal including a base band signal. The controlled oscillator is responsive to received baseband signals for varying the frequency of the variable low frequency signal and consequently the frequency of the local oscillator signal, and, in a transmit mode the controlled oscillator is responsive to transmit baseband signals for varying the frequency of the variable low frequency signal and consequently the frequency of the local oscillator signal.

Also in accordance with an aspect of the invention an FM transceiver being alternately operable in receive and broadcast modes, comprises: a mixer responsive to received and local signals for generating difference signals; a local oscillator for generating said local signal with a frequency substantially the same as a centre frequency of a signal intended for reception and being responsive to the difference signals received for deviating the frequency of the local signal toward the centre frequency of a signal being received, whereby when said signal being received is substantially the signal intended for reception, a difference between said centre frequency and the local signal frequency approaches 0 Hertz, the local oscillator also for generating said local signal with a frequency substantially the same as a centre frequency of a signal intended for broadcast and being responsive to signals representing information intended for broadcast for deviating the frequency of the local signal away from the centre frequency to provide a frequency modulated signal intended for broadcast.

In accordance with a further aspect of the invention a radio transceiver is alternately operable in receive and broadcast modes and includes a mixer responsive to received and local signals for generating received baseband signals, a local oscillator responsive to the received baseband signals for generating said local signal with a frequency substantially the same as a centre frequency of the received signal whereby said centre frequency is direct converted to substantially zero Hertz, a lowpass filter coupled in series between the mixer and the local oscillator for substantially suppressing alternating current signals of frequencies higher than a highest frequency a baseband signal intended for reception. In the broadcast mode, the local oscillator is responsive to transmit baseband signals representing information for broadcast, for frequency modulating the local signals to produce frequency modulated local signals, and the transceiver further includes an output amplifier being controllable to be responsive to the frequency modulated local signals for generating a power signal for broadcasting.

In an example which embodies the invention, a radio transceiver is operable in a broadcast mode for broadcasting signals being frequency modulated with originating information signals coupled thereto via an input port and alternately the radio transceiver is operable in a receive mode for receiving frequency modulated signals and deriving therefrom received information signals for supply to an output port. The radio transceiver comprises: an oscillator for generating an alternating current signal In the broadcast mode, the oscillator is responsive to signals at the input port for generating the alternating current signal with deviations of frequency representative said originating information signals. In the receive mode the oscillator is responsive to signals supplied to the output port for generating the alternating current signal with a frequency proportional to a carrier frequency of a received signal. In both modes, a controlled up converter is responsive to the alternating current signal from the oscillator for generating a local signal having a preselected frequency being modulated by said alternating current signal. In the broadcast mode, a broadcast amplifier amplifies the local signal to provide a broadcast signal. In the receive mode, a radio frequency amplifier receives radio frequency signals to produce received radio signals. A mixer is responsive to the received radio signals and the local signal for generating a mixed signal including difference signal components. A lowpass filter has a passband width of a maximum frequency substantially corresponding to a maximum deviation of frequency of any radio signal intended for reception. The lowpass filter is coupled between the mixer and the output port so that the difference signals from the mixer are passed to the output port.

In one example the controlled up converter comprises: a phase shifter having first and second outputs and being responsive to the alternating current signal from the oscillator for providing a pair of signals related in quadrature phase, the signal from the second output lagging the signal from the first output; a channel selector for generating any of a plurality of predetermined radio frequency signals at first and second outputs and being related in quadrature phase, the radio frequency signal from the second output lagging the radio frequency signal from the first output; a first balanced mixer having inputs coupled to the first outputs of the phase shifter and the channel selector and an output for providing first mixed signals; a second balanced mixer having inputs coupled to the second outputs of the phase shifter and the channel selector and an output for providing second mixed signals; and an adder for generating said local signal by summing said first and second mixed signals.

In accordance another aspect of the invention, a method of operating a radio transceiver to alternately receive and broadcast radio frequency signals comprises the steps of:

a) generating a local signal of a frequency similar to a radio frequency signal intended for reception and for broadcast;

b) mixing received signals with the local signal to generate mixed signals including a difference signal;

c) deriving a baseband signal by suppressing any mixed signals being of frequencies greater than a maximum bandwidth of frequency modulation information intended for reception;

d) continuously generating an alternating current signal;

e) adjusting a frequency of the alternating current signal in response to a direct current component of the base band signal and responsive to the adjusted frequency altering the frequency of the local signal being generated in step a) in response to the frequency of the alternating current signal, whereby the frequency of the local signal is more closely similar to the frequency intended for reception; and f) while broadcasting radio frequency signals, frequency modulating said alternating current signal with frequency deviations representing information for broadcast and altering the frequency of the local signal being generated in step a) accordingly, whereby the local signal is a frequency modulated signal for broadcasting.

BRIEF DESCRIPTION OF THE DRAWINGS

An example embodiment is discussed with reference to the accompanying drawings in which:

FIGS. 1a and 1b are a pictorial sketches which depict a typical use of a portable communications device such as a frequency modulation transceiver; and FIG. 2 is a block schematic diagram of a frequency modulation (FM) transceiver in accordance with the invention and which can be used to provide the portable communications device shown in FIGS. 1a and 1b.

DETAILED DESCRIPTION

In FIGS. 1a and 1b a tower mounted or otherwise elevated radio antenna 3 provides a link between a portable communications device 5 and a communications network, not shown. The communications network may be linked by radio signals with the portable communications device 5 in accordance with any of several known methods including simplex, wherein the portable communications device 5 responds to a signal broadcast from the antenna 3 by broadcasting a signal itself. For example in FIG. 1a the antenna 3 broadcasts a radio signal burst 3a at a frequency intended for reception by an antenna 6 of the portable communications device 5. Subsequently, after the portable communications device 5 has received the radio signal burst 3a, it responds by broadcasting a radio signal burst 5a of a similar, preferably identical frequency, via the antenna 6. When the portable communications device 5 is in active use for communication with another device via the network, these depicted functions occur repeatedly in rapid succession such that voice communications, for example, will appear to the user to be carried on in full duplex as is the case for a standard wire line telephone. Communications are not only voice but may extend over a range of information services and remote control functions limited only by the lesser bandwidth of either the communications network or either of the radio signal links 3a and 5a.

In FIG. 2, a basic architecture of the FM transceiver is exemplified, for convenience of understanding, by functional circuit blocks which are commonly available in the electronic circuits industry. Furthermore as the provision of energizing power is well understood by persons of typical skill in the field of radio electronics, such is not illustrated or further discussed.

The FM transceiver includes a radio frequency (RF) amplifier 11, preferably of a type referred to as a low noise amplifier, having an input coupled to an antenna 6, similar to the antenna 6 shown in FIGS. 1a and 1b, for amplifying radio signals received by the antenna 6. The RF amplifier 11 has an output port connected to a mixer 12 and a gain control port for receiving a control voltage from an automatic gain control (AGC) circuit 15. The mixer 12 is preferably a balanced mixer which in integrated circuit technology may be conveniently provided by a Gilbert cell. The mixer 12 operates to produce sum and difference signals by mixing the amplified radio signals with a local oscillator signal from a local oscillator 20, in a well known manner. The sum and difference signals are supplied to a lowpass filter 13, which is designed to have a bandwidth of a maximum frequency substantially corresponding to a maximum deviation of frequency of any radio signal intended for reception. Accordingly only those radio signals received and having a carrier or centre frequency which is close to the frequency of the local oscillator signal are passed by the lowpass filter 13. In other words the architecture as thus far described provides a so called zero hertz IF receiver, sometimes referred to as a direct conversion receiver. The output of the lowpass filter 13 is amplified by an amplifier 14 and coupled to a received (RX) data output 9, as well as with an input of the AGC circuit 15. Similar to the amplifier 11, the amplifier 14 includes a gain control input so that the gain of the amplifier 14 is controlled by the AGC circuit 15. The signals from the lowpass filter 13 may also be referred to as baseband signals and the amplifier 14 may be referred to as a base band amplifier.

The local oscillator 20 includes a channel selector, in this example a frequency synthesizer 22. A frequency synthesizer 22 is directed by a selection device, not shown, via a channel select input 29, to provide alternating current signals of a selected predefined frequency in quadrature relationship at outputs labelled 22$i$ and 22$q$. A voltage controlled oscillator (VCO) 16 provides a alternating current signal for adjusting the frequency of the local oscillator signal. In one example the VCO 16 is a low frequency ring oscillator, which generates the alternating current signal with a frequency being inversely related to a DC potential from the output of the amplifier 14. A phase shift circuit 21 provides half frequency replicas of the alternating current signal in quadrature relationship at outputs labelled 21$i$ and 21$q$. A balanced mixer 23 is coupled to mix the signals from the outputs 21$i$ and 22$i$ to produce mixed signals. A balanced mixer 24 is coupled to mix the signals from the outputs 21$q$ and 22$q$ to produce mixed signals. The mixed signal products from the balanced mixers 23 and 24 are utilized in an adder limiter circuit 26 which up converts the mixed signal products by performing a continuous addition function to the produce the required local oscillator signal at an output 27.

Switches 31 and 32 each provide a transfer switch function and are each illustrated for convenience in accordance with standard telephone contact symbology as having make and break elements being switchable between conductive and non-conductive states in an exclusive OR relationship referred to as a transfer function. The switches 31 and 32 are controlled, by apparatus not shown, to effect operation of the transceiver in either of the receive mode of operation and the broadcast mode of operation. During operation in the receive mode, signals are passed by the make elements of the switches 31 and 32 while the break elements are inhibited from passing signals. During operation in the broadcast mode, signals are passed by the break elements of the switches 31 and 32 while the make elements are in the nonconductive state.

More specifically, in the receive mode of operation, the local oscillator signal from the adder limiter circuit 26 is passed to the mixer 12 via the make element of the switch 31, and the make element of the switch 32 is controlled to pass signals from the antenna 6 to the input of the RF amplifier 11.

In the broadcast mode of operation the break element of the switch 31 is controlled to pass the local oscillator signal from the adder limiter circuit 26 to an input of a radio frequency (RF) power amplifier 18. The RF power amplifier 18 operates by amplifying any signals appearing at its input, with a predetermined amount of gain, to provide amplified signals at its output. The output of the RF amplifier 18 is passed via the break element of the switch 32 to the antenna 6, to effect broadcasting from the FM transceiver.

Information signals intended for broadcast can be supplied directly to the input of the VCO 16, however in this example the information signals intended for broadcast are supplied from a broadcast (TX) data input 8, via the lowpass filter 13 and the amplifier 14. The broadcast information signals are frequency spectrum limited by the lowpass filter 13, amplitude controlled by the amplifier 14 and applied to the VCO 16. The frequency for broadcast, having been selected via the channel select input 29, is modulated in response to the signal from the VCO 16 such that the RF power amplifier 18 drives the antenna 6 with a single side band frequency modulated broadcast signal.

It is envisaged that the FM transceiver in accordance with an architecture as generally described herein is advantageously manufactured as an integrated circuit structure. In view of the preceding disclosure, various examples of radio transceiver apparatus and methods for operation of radio transceiver apparatus will become apparent to persons skilled in the radio arts and in integrated circuit design. Such examples should be understood to be within the spirit of the invention, the scope of which is of record in the appended claims.

What is claimed is:

1. A direct conversion receiver comprising:
    a local oscillator for generating a local oscillator signal having a frequency within a preselected frequency range and being varied in response to a variable low frequency signal;
    a balanced mixer for generating a difference signal by mixing the oscillator signal with a received signal; and
    a controlled oscillator for generating the variable low frequency signal more than an octave lower than a signal intended for reception and in inverse relationship to a direct current component in said difference signal, whereby a substantially direct conversion of the received signal is obtained.

2. A direct conversion receiver according to claim 1, wherein the mixer is a balanced mixer.

3. A direct conversion receiver according to claim 2, comprising a radio transmitter including:
    a lowpass filter coupled in series between the mixer and the local oscillator for substantially suppressing alternating current signals of frequencies higher than a highest frequency a baseband signal extracted from the receivied signal; and
    in the broadcast mode, the local oscillator being responsive to transmit baseband signals representing information for broadcast, for frequency modulating said local signal to produce a frequency modulated local signals; and
    an output amplifier being controllable to be responsive to the frequency modulated local signals for generating a power signal for broadcasting.

4. A direct conversion receiver as defined in claim 1 comprising
    a lowpass filter having a bandwidth of a maximum frequency substantially corresponding to a maximum deviation of frequency of any radio signal intended for reception, the lowpass filter being coupled to receive signals from the balanced mixer and to send signals to the output port;

a receive amplifier having an antenna port for connection to an antenna, an output port connected to the mixer and a gain control port, the amplifier being responsive to a gain control signal for amplifying radio frequency signals appearing at the antenna port accordingly; and an automatic gain control circuit having an input coupled to receive signals having traversed the lowpass filter and being responsive to the amplitude of said signals for generating the gain control signal.

5. A direct conversion receiver as defined in claim 4 comprising;

a base band amplifier having an output connected in common to the output port and the input of the automatic gain control circuit, and being responsive to said gain control signal for amplifying said signals having traversed the lowpass filter accordingly.

6. A direct conversion receiver as defined in claim 4 wherein the input port of the receiver is coupled with the output port of the receiver, whereby the automatic gain control circuit is effective for both receiving radio frequency signals and broadcasting radio frequency signals.

7. A direct conversion receiver as defined in claim 6 wherein the input port of the receiver is coupled with the output port of the receiver via said lowpass filter, whereby a maximum frequency in said signal representation of said originating information is limited to be substantially similar to said maximum deviation of frequency of any radio signal intended for reception.

8. A direct conversion receiver as defined in claim 3 wherein the controlled up converter comprises;

a phase shifter having first and second outputs and being responsive to the alternating current signal from the oscillator for providing a pair of signals related in quadrature phase, the signal from the second output lagging the signal from the first output;

a channel selector for generating any of a plurality of predetermined radio frequency signals at first and second outputs and being related in quadrature phase, the radio frequency signal from the second output lagging the radio frequency signal from the first output;

a first balanced mixer having inputs coupled to the first outputs of the phase shifter and the channel selector and an output for providing first mixed signals;

a second balanced mixer having inputs coupled to the second outputs of the phase shifter and the channel selector and an output for providing second mixed signals, the second mixed signals lagging the first mixed signals in quadrature relationship;

an adder for generating said local signal from a continuous addition of said first and second mixed signals.

9. A direct conversion receiver as defined in claim 8, wherein the receive amplifier comprises:

an amplifier having an antenna port for connection to an antenna, a radio frequency output port connected to the mixer and a gain control port, the amplifier being responsive to a gain control signal for amplifying radio frequency signals appearing at the antenna port accordingly, and the radio transceiver further comprising:

an automatic gain control circuit being responsive to amplitudes of signals having traversed the lowpass filter for generating the gain control signal;

a base band amplifier having an output connected to the output port and to the automatic gain control circuit, and having a gain control port, the base band amplifier being responsive to said gain control signal for amplifying signals having traversed the lowpass filter, and wherein the input port of the radio transceiver is coupled with the output port of the radio transceiver via said lowpass filter, whereby a maximum frequency in said signal representation of said originating information is limited to be substantially similar to said maximum and the automatic gain control means is effective in both receiving radio frequency signals and broadcasting radio frequency signals.

10. A radio receiver as defined in claim 2, said controlled oscillator comprising:

a ring oscillator, and an up converter.

11. A radio receiver comprising:

a local oscillator for producing a local oscillator signal and being responsive to a low frequency signal for varying the phase of the local oscillator signal;

a mixer for mixing the local oscillator signal with received signals to produce a direct conversion of received signals having a frequency substantially similar to the local oscillator signal;

a low pass filter having a bandpass characteristic with a roll-off frequency corresponding to a highest frequency with which a signal intended for reception has been modulated; and a controlled oscillator responsive to a direct current signal coupled via the lowpass filter for generating an ac signal of a frequency inversely related to an amplitude of the direct coupled signal and more than a plurality of octaves lower than the frequency of the signal intended for reception; and said local oscillator generating a signal of a predetermined frequency and upconverting the ac signal to a multiple of a predetermined frequency; whereby the local oscillator signal is adjusted toward a centre frequency of the signal intended for reception.

12. A radio receiver as defined in claim 11 wherein the controlled oscillator is a ring oscillator.

* * * * *